United States Patent [19]
Shagam

[11] Patent Number: 6,076,126
[45] Date of Patent: Jun. 13, 2000

[54] SOFTWARE LOCKING MECHANISM FOR LOCKING SHARED RESOURCES IN A DATA PROCESSING SYSTEM

[75] Inventor: Eli Shagam, Brookline, Mass.

[73] Assignee: EMC Corporation, Hopkinton, Mass.

[21] Appl. No.: 08/884,890

[22] Filed: Jun. 30, 1997

[51] Int. Cl.[7] .............................. G06F 13/16; G06F 12/14
[52] U.S. Cl. ......................... 710/108; 710/107; 710/200; 711/150; 711/152; 709/210
[58] Field of Search ...................... 395/288, 287, 395/289, 856; 711/147–153; 710/108, 107, 109, 36, 200, 240; 709/210

[56] References Cited

U.S. PATENT DOCUMENTS

| | | | |
|---|---|---|---|
| 4,000,485 | 12/1976 | Barlow et al. | 395/726 |
| 4,587,609 | 5/1986 | Boudreau et al. | 395/726 |
| 5,321,825 | 6/1994 | Song | 711/163 |
| 5,432,929 | 7/1995 | Escola et al. | 707/9 |
| 5,459,840 | 10/1995 | Isfeld et al. | 395/309 |

*Primary Examiner*—Ayaz R. Sheikh
*Assistant Examiner*—Ario Etienne
*Attorney, Agent, or Firm*—John M. Gunther, Esq.; Leanne J. Fitzgerald, Esq.

[57] ABSTRACT

A shared resource lock mechanism is provided which enables processors in a mullet-processor environment which each share common resources to obtain locks on those resources using a read modify write type transaction which does not at any point in time require the locking of a bus or a memory which contains the lock records used to lock the particular resources.

5 Claims, 3 Drawing Sheets

SOFTWARE LOCKING MECHANISM FOR LOCKING SHARED RESOURCES IN A DATA PROCESSING SYSTEM

BACKGROUND OF THE INVENTION

This invention relates generally to data processing systems and more particularly to a method and apparatus for eliminating the bus locking requirement normally associated with transactions used to manipulate system locks.

As it is known in the art, data processing systems generally include several types of processing resources which may be interconnected by one or more communication busses. In addition to the processor resources, data processing systems also generally include some sort of memory which is typically shared amongst the processor resources. As is common in many computer systems these processing resources may act independently to perform different processing tasks. Since each of the processing resources may act independently there may arise a situation where there is contention for the shared memory resources within the system.

One example of a data processing system which includes several processing resources coupled to a common memory over one or more busses are data storage systems such as the Symmetrix family of data storage systems manufactured by EMC Corporation. These storage systems are typically capable of being coupled to several different host computers at any given time and provide storage services to each of those computers independently. In order to support transactions between a plurality of host computers simultaneously the storage system includes several host controllers for managing the communication between the host computer and the storage system. In addition, the Symmetrix storage systems mentioned above include several disk controllers which are each responsible for managing one or more arrays of disk type storage devices.

In addition to the host controllers and disk controllers mentioned above the storage subsystem may also contain a very large global memory which is used to manage the transfer of data from the host computers to the storage devices as well as to manage the transfer of data from the storage devices to the host computer.

During the operation of the data storage system described above, it is often necessary for any one or the host controllers or disk controllers to require access to a particular section of the global memory in order to set a system lock in order to guarantee exclusive access to a particular storage system resource. One method known in the art for doing such a process is to perform a so called read/modify/write operation with a lock.

In order to perform such a command, prior art data processing systems require that the requesting processor gain exclusive access to the bus and to the memory storing the lock records. Once the requesting processor gains control of the bus, the bus is locked to all other users connected to the bus. During the period when the bus is locked, the requesting controller will generally read the data from the lock data structure into it's own internal memory. The processor will then operate to modify the data (i.e. write the data necessary to lock the resource) and then write the data back to lock data structure in the memory.

The reason that the bus is generally locked throughout this entire transaction is to prevent another processor from attempting to perform a similar operation. That is for example, if the original processor was modifying the lock record data structure and the bus was not in the lock state, a second processor might read the lock data structure and think that no other processor held the lock on that resource and also attempt to lock the same resource. By locking the entire bus, other processors are prevented from coming in and accessing that particular lock record. The disadvantage of such a scheme is fairly obvious in that not only can other processors not access the shared lock records, the other processors cannot carry on any other transactions over the locked system bus while the first processor is doing those operations necessary to gain a lock on the system resource.

In a system with a dual bus architecture, it might first appear that the system would be able to continue to perform useful work over the second bus while the first bus was locked in order for the first processor to do the lock transaction. However, as described above, the memory with the desired lock record is locked as well. If one of the processors connected to the second bus attempted to gain access to the same memory which was the subject of the first locked transaction in order to perform any memory transaction, the second processor would proceed as described above for the first processor. The second processor would first gain access to the second bus. It would then attempt to access the memory which has already been locked by the first processor. The second processor will wait for the memory to become unlocked so that it can perform its transaction. At this point, both buses and the memory are locked by the two processors trying to accomplish lock transaction to the same memory. It can be seen then that this scenario leads to a situation when the entire system is prevented from doing any useful work because two processors are seeking to get locks on system resources. This problem is extensible to systems of multiple buses and those that may use cross bar switches to provide connectivity between various elements of a data processing system.

Previous methods attempting to solve the above described bus/system lock problem have generally included maintaining a table within the memory indicating which addresses within the memory are locked at any given. In order to perform lock functions, the table would need to be accessed and read. This solution, however, may still lead to the situation where at least one bus in a multi-bus system is locked while the lock records are updated using an exclusive read modify write (with lock) type command.

It would be advantageous therefore to provide a data processing system in which resources such as a memory are shared amongst a plurality of processing devices where hardware locks could be set and reset without requiring that any of the busses be locked and thereby preventing the system from doing useful work.

SUMMARY OF THE INVENTION

In accordance with the present invention, a lock mechanism for managing shared resources in a data processing system is provided. The lock mechanism of the present invention eliminates the prior art need of locking buses and memories during the lock setting transaction. The invention includes a lock manager which is local to the memory having the lock records associated with the shared resources. In one embodiment, the lock mechanism operates as follows. When a processor of the data processing system desires to set a lock, it first issues a normal read request to the memory in order to read the lock record associated with the resource to be locked. In response, the memory reads the data from the lock record and transmits is to the processor. Upon receipt, the processor examines the data to determine if another processor has already locked the resource. If no other processor has locked the resource, the processor transmits the data it received from the memory, plus a new lock record data byte to the memory in a single write transaction. When the memory receives the old and new lock data, it compares the old lock data with the data currently stored in the corresponding lock record. If the data match, the indication is that no other processor has set the lock while the first processor was reading and preparing its lock data. At this point the memory overwrites the lock record with the new data, thus giving the processor a lock on the resource. With such an arrangement, the locks associated with shared resources in a data processing system may be set by processors without the need to lock the system busses and memories.

In another aspect of the invention, locks having known unlocked data values may be updated using a single write transactions. Here, the processor sends the new lock data along with the known unlocked data as the old data. When the memory receives the new and old data, it compares the old data with the data in the corresponding lock record. As above, if the data match, the memory will overwrite the data in the lock record with the new data, thus granting the lock to the processor.

Variations of the basic invention may be used to update shared counters as well as setting and clearing bits of system bitmaps. The key resides in the fact that the present invention eliminates the bus and memory locking associated with prior art lock mechanisms.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
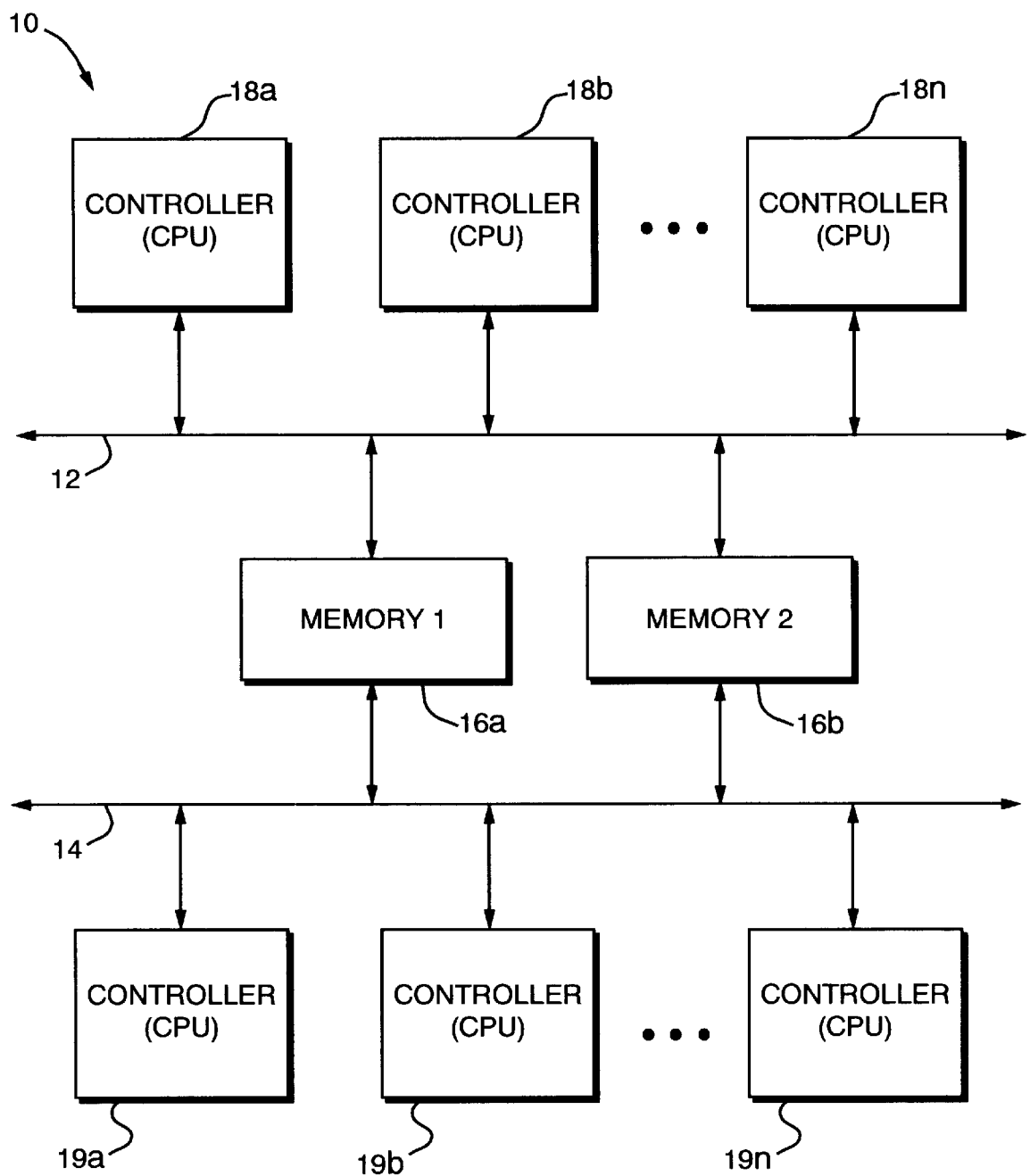
FIG. 1 is a block diagram of a preferred embodiment of the data processing system incorporating the present invention.

Referring now to FIG. 1, a preferred embodiment of data processing system incorporating the present invention is shown. In particular, data processing system 10 is shown to include a plurality of controllers or processors 18a through 18n. Each of these controllers is coupled to a first data processing bus 12. Also included in data processing system 10 are a second plurality of controllers or processors 19a through 19n coupled to a second data processing bus 14. Each of the controllers 18a through 18n and 19a through 19n are also coupled to a first and second memory 16a and 16b via the respective busses 12 and 14. The controllers 18a through 18n and 19a through 19n could be any type of electronic device which transmits, receives or operates on computer data. Furthermore, the controllers 18a–18n and 19a–19n may be alternately coupled to buses 12 and 14. For example controller 18a may be coupled to bus 12 while controller 18b is coupled to bus 14. Similarly controller 19a may be coupled to bus 14 while controller 19b is coupled to bus 12.

In a preferred embodiment of the present invention, controllers 18a through 18n are so-called host controllers and are resident within a storage subsystem. As such controllers 18a through 18n are used to manage the communications between a variety of host computers (not shown) and the storage system of which they are a part. Also according to the preferred embodiment, controllers 19a through 19n are so-called disk controllers which are used to manage the transfer of data between arrays of disk storage devices (not shown) and the host computers via the host controllers 18a through 18n and memories 16a and 16b. Although the present invention will be described in the context of a data storage system, the principles of the invention are equally applicable to any multiprocessor data processing system incorporating a shared memory. For example, the lock mechanism of the present invention is applicable to a multiprocessor host computer system where the processors communicate over shared busses and share a global and or cache memory. Thus, the storage system aspects described for the preferred embodiment should not be seen as limitations of the present invention.

During the operation of data processing system 10, it is often necessary for each of the controllers 18 and 19 to access each of the memories 16a and 16b in order perform their respective data processing functions. Since each of the memories is coupled to each of the busses 12 and 14 which are in turn coupled to each of the controllers, the memory resources are generally shared by each of the controllers within the data processing system. Each of the memories 16a and 16b may be used to maintain a so-called lock record or a plurality of lock records which correspond to various resources within the data processing system 10. One example of a resource which may have an associated lock record stored in one of the memories would be a particular one of the physical storage devices coupled to one of the controllers 19a through 19n.

At some time during the operation of data processing system 10 it may be necessary for one of the controllers, for example controller 19a, to gain exclusive control over one of it's associated storage devices. In order to do so, controller 19a would need to establish a lock in whichever memory the lock record was maintained. As described in the background of the invention section, previous methods of manipulating a resource lock have included performing a three memory cycle transaction in order to set a resource lock. There are at least two general types of lock cycles. One is a read/modify/write lock cycle and the other is a read/compare/write lock cycle. The read modify write lock cycle may be used to increment a shared counter within data processing system 10. The read/compare/write lock cycle may be used in data processing system 10 to manipulate software locks.

For a read/compare/write lock cycle, the first memory cycle would include having controller 19a read the associated lock record from, for example memory 16a, into a local storage of controller 19a. Once the lock record is read into the local storage of controller 19a, the CPU of controller 19a would examine the lock record data in order to determine whether or not the record data read from memory 16a indicated that the resource that controller 19a desired to lock had already been locked by another controller. Generally this may be indicated with something as simple as having a single bit set in a particular location of the lock record which indicates whether or not the resource is locked or not locked. In prior art systems, once the controller determined that the resource was not locked, the controller would then execute a so-called read lock operation to the same lock record in memory 16a.

A read lock operation includes having controller 19a gain control of bus 14 and place bus 14 in a locked state. As described previously, having bus 14 in a locked state means that no other controller attached to bus 14 may use the bus to perform any transactions. Furthermore, the read lock operation causes the memory 16a (i.e., the memory having the desired lock record) to also be placed in locked state. This would result in memory 16a being unavailable for access by any controller in data processing system 10. While controller 19a has exclusive access to the bus 14 and memory 16a, it will do a second read of the lock record within memory 16a and again analyze the record to ensure that between the time when it first read the lock record and the time it gained exclusive access of the bus that the record had not been locked another controller. Once the controller determines that the record is not already locked it will update lock record in memory 16. Updating the lock record includes writing any data required to identify the resource associated with the lock record and also set the appropriate bit indicating that the record has been locked. Once the write transaction has been completed, the memory 16a and bus 14 will be released by controller 16a and return to a state where they may be used by other controllers of data processing system 10.

The disadvantages of the above described locking scheme are apparent and have been described in the background of the invention section. Thus, according to the present invention an improved lock mechanism is provided which does not require the locking of either memory 16a or 16b, or either bus 12 or 14 by a controller which is seeking to gain a lock over particular resource of data processing system 10. In it's most general form one aspect of the lock mechanism of the present invention allows the setting of software locks and operates as follows. When one of the controllers of data processing system 10 (for example controller 18b) needs to gain exclusive control over a resource of data processing system 10 (i.e. set a software lock), the controller 18b will first read the associated lock data from the appropriate lock record from the memory 16a or 16b and store it in a local storage of the controller 18b. The controller will then examine the contents of the data read from the lock record data to determine whether the resource is already locked (i.e., whether a lock indicator has been established in the lock record). If the data read from the memory indicates that the record has been locked by another controller of the data processing system, then the lock transaction ends at that point in time. If, however, the controller determines that the resource has not been locked by another controller, the controller will prepare new lock data to be written to the lock record of the associated memory and transmit this new lock record data along with old lock record data to the memory.

Once the memory 16a has received both the new and the old lock record data associated with the lock record, the memory will operate to compare the old lock record data received from controller 18b with the current contents of the target lock record to determine if the lock record (i.e. the resource associated with the lock record) is still in an unlocked state. If the record is in an unlocked state, the memory will then overwrite the contents of the lock record with the new lock record data received from controller 18b, thus locking the associated resource by controller 18b. It should be noted that the initial read of the lock record by controller 18b is done as a normal read operation which did not require locking bus 12 or the memory which contained the locked record. Furthermore, the writing of the old data and new data to the memory 16a is accomplished with a normal write operation which does not require the locking of bus 12 or the memory containing the locked record. As such it can be seen that using the present invention, a system of locks in data processing system 10 may be manipulated and maintained without requiring either the memories or the busses 12 and 14 to be locked for any part of the lock manipulation transactions.

Another example of a lock cycle is the read/modify/write operation used to increment a shared counter as mentioned above. In accordance with the invention, the procedure for incrementing a shared counter operates in a similar fashion as described above with the read/compare/write operation used for software locks. The necessity of prior art systems to lock the bus and the counter resource in order to update the counter is well known. The present invention eliminates the bus/resource lock associated with the prior art methods. According to the invention, in order to update a shared counter, the updating controller will read the counter value from the memory as described above. However, instead of examining the counter to determine a lock state, the controller will simply increment the counter and transmit both the incremented value and the old value to the memory in a single bus transaction. Upon receipt, the memory will compare the old value as received from the controller with the current value in the memory. If the two values match, then the counter was not incremented during the interim when the controller was updating the counter value. At this point, the memory will overwrite the old counter value with the incremented value.

If the old counter value transmitted to the memory by the controller had not matched the current value in the memory, this would have indicated that another controller had incremented the counter. Thus the attempt by the first controller to increment the counter would fail. Such a failure would be transmitted by the memory to the first controller.

Figure 2:
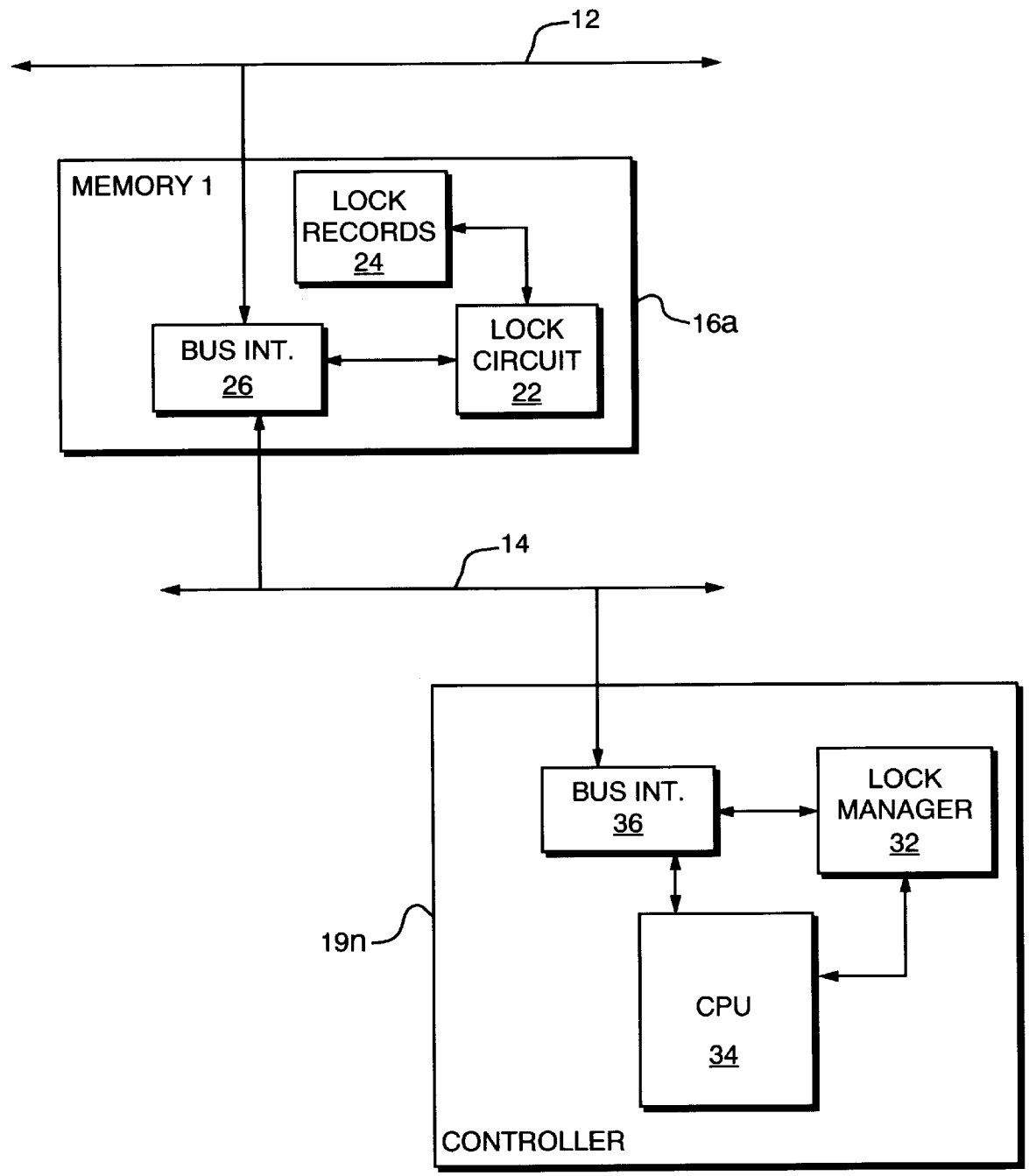
FIG. 2 is a block diagram of exemplary ones of the memory and controllers of the data processing system of FIG. 1 and shows in detail a preferred embodiment of the lock mechanism of the present invention.

Referring now to FIG. 2, the lock mechanism of the present invention will now be described in more detail. FIG. 2 depicts an exemplary one of the controllers from FIG. 1 as well as an exemplary one of the memories also from FIG. 1. As shown in FIG. 2, each one of the controllers includes among other things a bus interface 36 coupled to a lock manager 32. Additionally, lock manager 32 is also coupled to CPU 34. Bus interface 36 provides the interface between controller 19n and bus 14 as shown.

Memory 16a includes among other things a lock circuit 22 which is coupled to both the bus interface and the lock record data structure 24. Bus interface 26 of memory 16a provides similar functions as bus interface 36 of controller 19n. That is, the bus interface provides an interface between memory 16a and bus 14. In addition, bus interface 26 of memory 16a also provides an interface to bus 12.

As described previously, in order to access and set a lock of one of the locks in lock record data structure 24, controller 19a will first send a request from CPU 34 via bus interface 36 over bus 14 to bus interface 26 indicating that it wishes to read a particular lock record from lock records 24. Memory 16a will respond by having lock circuit 22 access the lock records 24 reading the data from particular lock record and transmitting the data from the particular lock record to controller 19a via bus interface 26. Controller 19a will receive the data from the lock record at bus interface 36 and pass a copy of the data to lock manager 32. Lock manager 32 will examine the data read from the particular lock record to determine whether the resource associated with the lock from lock records 24 has already been locked by another controller of the data processing system. In addition, lock manager 32 in cooperation with CPU 34 will prepare a new set of data to be written to the lock record associated with the lock record data originally read from lock record data structure 24. If lock manager 32 has determined that the lock read from lock record data structure 24 is not locked by another controller of the data processing system, the lock manager will pass the original data read from the lock record along with the new data prepared by CPU and lock manager 32 via bus interface 36 and bus 14 to memory 16a.

Both the new and old data will be received by the bus interface 26 and passed to lock circuit 22. Lock circuit 22 will then read the associated lock record again from lock record data structure 24, and compare the data read from the lock record with the old lock record data transmitted by controller 19n. If the two data match, the indication is that during the time when controller 19a has been analyzing and preparing new lock record data that no other controller has set a lock on that particular resource via the associated lock record. At that time, lock circuit 22 will then copy the contents of the new lock record data into the lock record of lock record data structure 24. Once written, controller 19n will have exclusive control over the resource associated with particular lock record until controller 19n releases the lock.

It should be understood that the initial read of the lock record from lock record 24 is done using a standard read command by controller 19n. If, after reading the lock record, the lock manager 32 had determined that another controller had locked the resource of interest, then the lock cycle ends and no additional bus activity occurs unless controller 19n wishes to check the particular lock at a later time. Furthermore, the process of obtaining the lock of the particular resource by writing the associated lock record data to lock record data structure 24 is also achieved without locking bus 14. The locking of the particular resource is achieved by performing a standard write command which transmits two words of data in a single transaction over bus 14 to bus interface 26 of memory 16a. The remaining processing required to obtain a lock on a particular resource is then handled by lock circuit 22 in cooperation with lock records 24 as described above.

If, after transmitting, the two words of data (i.e., old lock record data and new lock record data) lock circuit 22 determines that another controller obtained a lock in the interim, memory 16a will transmit a status to controller 19n indicating that the lock had failed. On the other hand, if no other controller of the data processing system had obtained a lock on the particular resource, memory 16a will transmit a status indicating a successful completion of the lock command (i.e. granting of the lock) to controller 19n.

Figure 3:
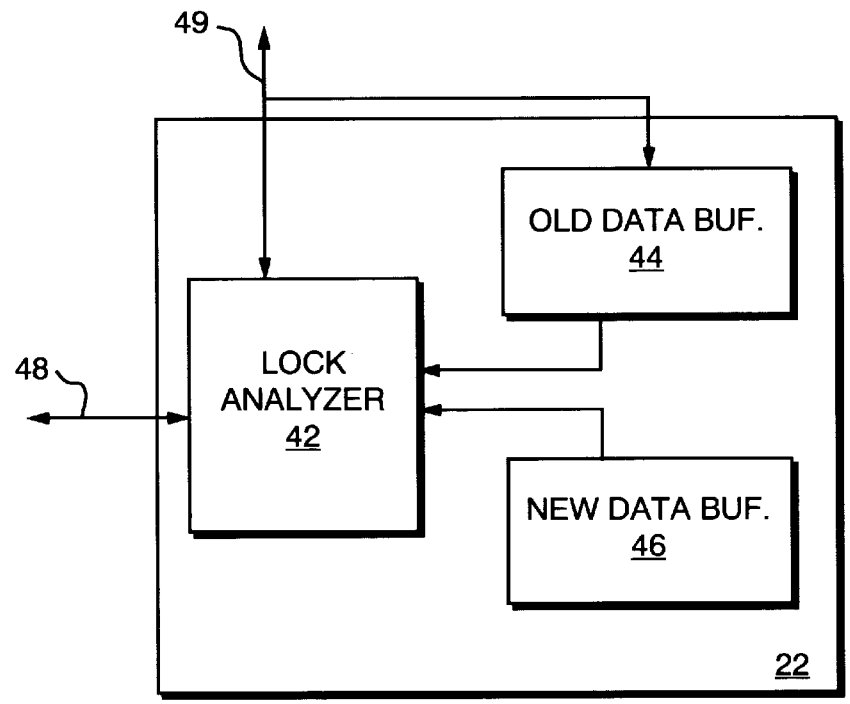
FIG. 3 is a block diagram of an exemplary one of the lock mechanisms included in a memory of the data processing system of FIG. 1.
Figure 4:
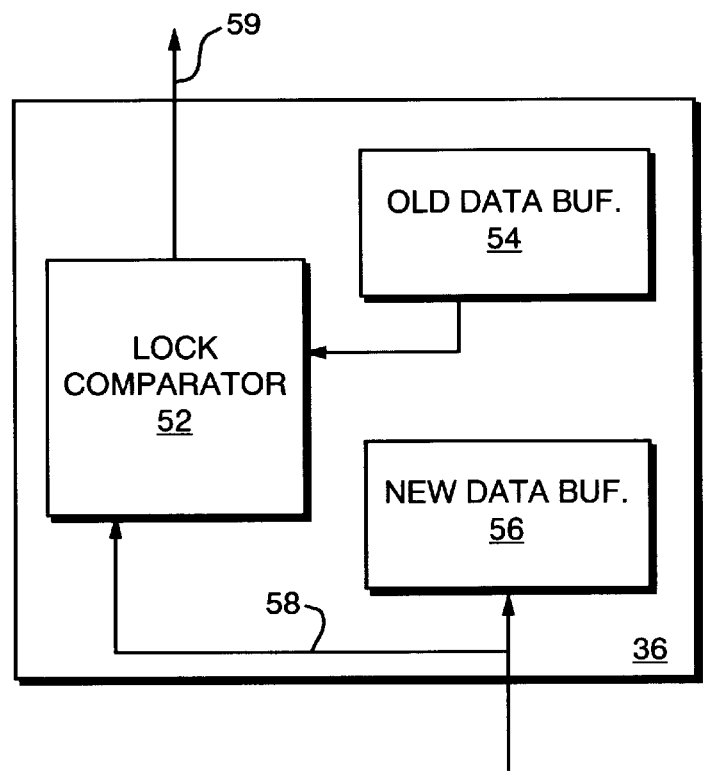
FIG. 4 is a block diagram of an exemplary one of the lock mechanisms included in a controller of the data processing system of FIG. 1

Referring now to FIGS. 3 and 4, preferred embodiments of the lock circuit 22 and lock manager 32 respectively will be described. Referring first to FIG. 3, lock circuit 22 is shown to include a lock analyzer 42 which is coupled to both an old data buffer 44 and a new data buffer 46. In addition, lock analyzer 42 is also coupled via bus 49 to the lock records 24 (FIG. 2) as well as being coupled via bus 48 to bus interface 26 (FIG. 2). As described previously during the lock manipulation process lock, lock circuit 22 will first read the appropriate lock record data from lock record data structure 24. This is accomplished by transmitting the data over bus 49 to lock analyzer 42. Lock analyzer 42 will then transmit the lock data over bus 48 to the bus interface 26 and over bus 14 to controller 19n. Ultimately, the lock record data is received by the lock manager 32 of controller 19n.

Referring now to FIG. 4, lock manager 32 is shown to include a lock comparator 52 as well as an old data buffer 54 and a new data buffer 56. When the lock comparator receives the lock record data as read from memory 16a via bus 59, the lock record data will be placed in old data buffer 54. The lock comparator 52 will at that time examine the data in old data buffer 54 to determine if resource associated with the lock record has already been locked. If the lock record does not indicate that the resource has already been locked then the new lock record data which has been placed into new data buffer 56 by CPU 34 (FIG. 3) will be transmitted by lock comparator 52 over bus 59 along with the old data from old data buffer 54 back to the lock circuit 22 of memory 16a. Once received by the lock circuit 22, the old lock record data will be placed into the old data buffer 44 and the newly created lock record data will be placed in the new data buffer 46. At this time, the lock analyzer 42 will again read the same lock record data via bus 49 and compare the newly read lock record data to the data stored in old data buffer 44. If the newly read lock record data matches the data stored in the old data buffer 44, that indicates that a lock has not been achieved in the interim and at this point in time the lock analyzer will transmit the data from new data buffer 46 into the lock record of lock records 24. This process thus grants controller 19n exclusive control over the resource associated with the particular lock record with locking either system bus 12 or 14 and without locking either memory 16a or 16b.

Other variations of the lock mechanism described above are contemplated by the present inventions. Each of the variations takes advantage of the speed increase gained by moving critical portions of the lock functions into the memories to be performed by the memory hardware rather than the software of the requesting processors.

One variation of the invention is the setting of a software type lock in a single transaction. This may be possible where it is known before hand what the data representation of a free lock is. For example, it may be known that the lock record associated with a particular resource has a value of all 0's when the resource is not locked. In this case the processor seeking to lock the resource may, in a single transaction send a the new and old data packets without first reading lock data from the memory. Since the processor knows the unlocked resource record data, it simply transmits that as the old data along with the new lock data. When the memory receives the new and old data, it operates as described above. That is, it compares the old data received from the processor to the data in the lock record. If the data match, the resource is not locked and the memory will proceed to write the new lock data to the lock record. In this way, a processor locks a resource with a single bus transaction which did not lock either the bus or the memory.

Another variation is to use the basic lock concepts of the present invention to turn bits on and off in certain shared data locations in memory. To manipulate individual bits, the process for performing software locks described above my be used with the substitution of a logical "OR" or "AND" operation for the compare operation used to set a software lock.

In addition, the lock record data structure of the preferred embodiment is described as being stored in a shared memory of the data processing system. It should be understood that the lock mechanism of the present invention anticipates accessing any shared resource regardless of type. Thus for example, two processor which may lock a bus for exclusive communications may use the lock mechanism of the present invention to perform their communications without the need for locking the bus over which they communicate.

As mentioned previously, the present invention is broadly applicable to multiprocessor data processing systems which employ a shared memory. Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. A method of providing lock services for shared resources comprising the steps of:

transmitting by a first processor, a read request over a bus to a first entry in a lock record data structure;

reading data from said first entry into a first buffer, said data identifying one of said shared resources and indicating whether said shared resource is locked by a second processor;

examining said data to determine if said shared resource is locked by said second processor;

preparing new data for writing to said lock record data structure, said new data identifying said first processor and indicating that said first processor owns a lock on a first resource;

transmitting said data and said new data to said lock record data structure;

re-reading data from said first entry from said lock record data structure;

comparing said re-read data to said data; and if said re-read data matches said data, writing said new data to said entry in said lock record data structure.

2. A data processing system having access to a shared resource said data processing system comprising:

a plurality of processing units coupled to a memory via at least one bus;

a lock manager within said memory for reading a lock record and analyzing lock record data, said lock record data corresponding to said shared resource and indicating whether one of said plurality of processing units has locked said shared resource, said lock manager responsive to receipt, from one of said processing units, of a first lock record data byte and a second lock record data byte for determining if a resource associated with said first and second data byte is locked by another one of said processing units and for granting a lock of said shared resource to said one processing unit when said shared resource is not locked by said other one of said processing units.

3. A method of managing shared resources by a memory coupled to a processor in a data processing system comprising the steps, performed by said memory of:

requesting, by said processor, a lock on one of said shared resources;

receiving a first lock data byte and a second lock data byte;

comparing said second lock data byte to a lock record data byte of said memory, if said second lock data byte and said lock record data byte match, overwriting said lock record data byte with said first lock data byte and;

prior to receiving said first lock data byte and said second lock data byte, transmitting to said processor, data read from a location corresponding to said lock record data byte, said data being equal to said second lock data byte.

4. A lock manager for managing locks in a data processing system without locking memories or buses of said data processing system, said lock manager comprising:

a lock record data structure for storing lock records associated with shared resources of said data processing system;

a first temporary lock record data buffer;

a second temporary lock record data buffer;

an interface for receiving data and placing said data in said first and second temporary lock record data buffers;

a comparator for comparing data in said second lock record data buffer to data stored in a lock record of said lock record data structure; and an updater, responsive to said comparator, for overwriting said data in said lock record of said lock record data structure when said data in said second lock record data buffer is equal to said data stored in a lock record of said lock record data structure.

5. The lock manager according to claim 4 wherein said data includes a first byte including lock information generated by a processor desiring a lock on one of said resources and a second byte including lock data previously read from a lock record of said lock record data structure and corresponding to said shared resource and wherein said first byte is stored in said first temporary lock record data buffer and said second byte is stored in said second temporary lock record data buffer.

* * * * *